United States Patent [19]

Clohessey

[11] Patent Number: 5,449,259
[45] Date of Patent: Sep. 12, 1995

[54] THREAD LOCKING DEVICE

[75] Inventor: Kip E. Clohessey, Milwaukie, Oreg.

[73] Assignee: Warn Industries, Inc., Milwaukie, Oreg.

[21] Appl. No.: 209,872

[22] Filed: Mar. 11, 1994

[51] Int. Cl.⁶ .............................................. F16B 37/12
[52] U.S. Cl. .................................. 411/262; 411/252; 411/438
[58] Field of Search ................ 411/252, 262, 432, 438

[56] References Cited

U.S. PATENT DOCUMENTS

| | | | |
|---|---|---|---|
| 1,630,958 | 5/1927 | Mauch | 411/262 X |
| 1,909,387 | 5/1933 | Young | 411/262 |
| 1,929,169 | 10/1933 | Hall | 411/262 |
| 2,604,135 | 7/1952 | Rydberg | 411/262 |

FOREIGN PATENT DOCUMENTS

| | | | |
|---|---|---|---|
| 1027971 | 5/1953 | France | 411/262 |
| 411183 | 3/1925 | Germany | 411/438 |

Primary Examiner—Neill R. Wilson
Attorney, Agent, or Firm—Klarquist, Sparkman, Campbell, Leigh & Whinston

[57] ABSTRACT

A thread locking device for securing a male threaded member to a female threaded member at a desired interengaged position. A nut, threaded internally, and a spiral spring in combination form the thread locking device. The spring is mounted in the nut with the end tabs of the spring extending radially into a slot provided in the nut. The spring is configured to also threadably engage the threads of a member, such as a shaft, to which the nut will be threadably mounted. The spring in its relaxed state will forcibly grip the thread form of the shaft to frictionally secure the nut in position on the shaft. The radially extending end tabs of the spring are forced apart by a tool to enlarge the diameter of the spring to facilitate the threadable installation of the nut and the spring to the shaft and the removal of the nut and spring from the shaft.

4 Claims, 1 Drawing Sheet

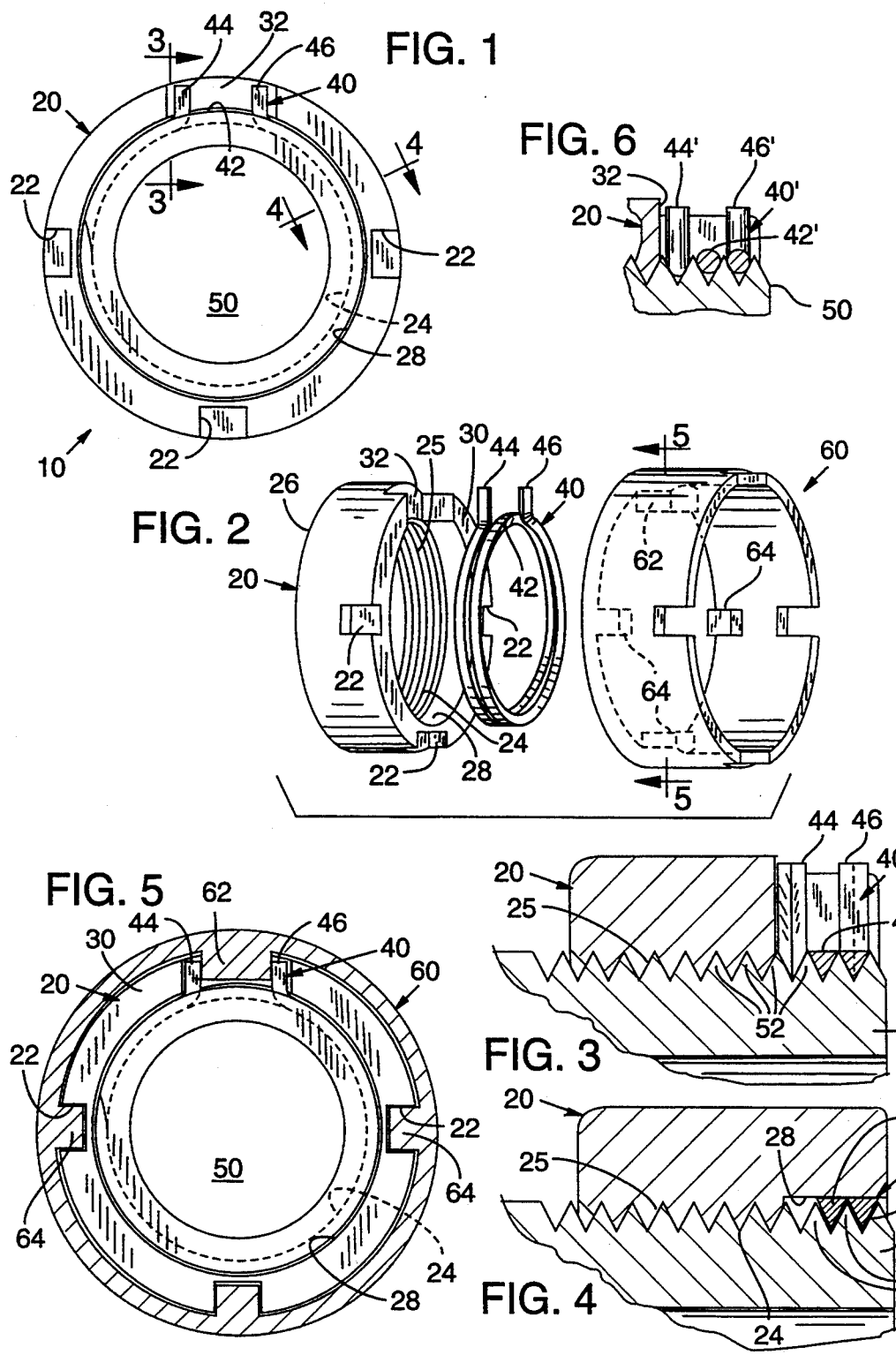

THREAD LOCKING DEVICE

FIELD OF THE INVENTION

This invention relates to a device that incorporates threads, e.g., female threads of a nut, whereby the nut can be screwed into a desired position, e.g., on a threaded shaft and locked in place at that desired position.

BACKGROUND OF THE INVENTION

There are numerous applications where a nut is screwed into place and then locked at that position. Two common ways are to apply a second nut to the shaft that is tightened against the first nut and the combined stress on the threads provides effective locking. A second is to provide a set screw that is screwed through the side of the nut and into the threads of the shaft.

Neither of the above provides an adequate solution for many applications, e.g., for securing a compression nut against a wheel bearing provided on an axle of a vehicle. A common way to secure a compression nut on a vehicle axle is to screw the nut onto the axle until the desired compression is achieved and then slide a locking ring over the axle with the locking ring secured so as to be non-rotative relative to the axle. The locking ring is provided with fingers that are sized to engage holes in the compression nut. The fingers are projected into the holes thereby preventing the nut from turning.

The latter device achieves the desired locking function but not necessarily at the precise rotative position that is desired for the nut. When the desired compression is attained and the locking ring fingers do not align with one of the holes, the nut has to be backed off or be over compressed to line up the hole with the finger. There is also the simple problem of forgetting to add the locking ring.

Other locking devices have similar problems and an object of the present invention is to provide a locking nut or device that has a locking member incorporated into the device and automatically sets or locks when the desired position is achieved.

SUMMARY OF THE INVENTION

In the preferred embodiment of the present invention, a thread gripping helical wire is incorporated into a compression nut. A thread portion of the nut is replaced with a spiral-shaped wire having a cross section that hits the grooves of the external threads on a shaft. The ends of the wire are bent outward of the spiral and project into a radial hole or slot in the nut. These bent ends are referred to as end tabs. The wire is permanently stressed to urge winding of the spiral wire and thus the end tabs are urged toward each other. Forcing the tab ends apart forces an unwinding of the spiral. The nut is provided with peripheral axially directed slots and a tool including fingers is provided with the fingers projected into the slots for gripping and turning the nut onto the shaft. The radial slot or opening through which the tab ends of the spiral wire are projected is aligned with one of the peripheral axially directed slots for receiving a tool finger. The tool is applied to the nut and a finger of the tool is forced between the tab ends to open the spiral. This relaxes the wire from its inwardly directed gripping. The nut is then screwed onto the shaft with the spiral wire sliding through the thread grooves as would the female threads of the nut which is replaced with the wire. When the desired compression is achieved, the tool is withdrawn and the tab ends close together wrapping the spring tightly around the shaft in the screw threads thereof to prevent removal until the tab ends are again separated.

The invention will be more clearly understood by reference to the following detail description and drawings referred to therein.

BRIEF DESCRIPTION OF THE DRAWINGS

FIG. 1 is a view of the thread locking device of the present invention;

FIG. 2 is an exploded view of the thread locking device of the present invention shown with a tool for rotating the thread locking device;

FIG. 3 is a view of the thread locking device as viewed on view lines 3—3 of FIG. 1;

FIG. 4 is a view of the thread locking device as viewed on view lines 4—4 of FIG. 1;

FIG. 6 is a view similar to FIG. 3 showing an alternate spring of the thread locking device; and, FIG. 5 is a view of the thread locking device of the present invention and the tool as viewed on view lines 5—5 of FIG. 2.

DESCRIPTION OF THE PREFERRED EMBODIMENT

Refer now to FIGS. 1 and 2 of the drawings which illustrates a thread locking device 10. The thread locking device 10 will secure two threaded members threadably installed one to the other in a fixed relative rotative position. There are many instances where it is necessary to fixedly maintain the relative position of the members threadably joined together. One example is the retention of bearings on a shaft or spindle by a retaining nut. The nut is usually torqued to a determined setting and it is preferable that the nut be maintained in this position.

The locking device 10 in this embodiment is a nut 20 and helical spring (wire) 40 that cooperatively define the locking device 10. The nut 20 is of the type that is frequently utilized in securing bearings on a spindle or shaft and the like. The body of the nut 20 has notches 22 formed on its periphery at spaced intervals to facilitate rotating the nut either clockwise or counterclockwise by a compatible tool 60 (see FIGS. 2 and 5). The nut 20 has two internal diameters, a small diameter 24 that extends inward from end 26 and a larger diameter 28 that extends inward from end 30 to the end of the small diameter 24. The smaller diameter 24 is threaded along its full length in a conventional manner, the threads being designated as 25. A radial slot 32 is provided in end 30 of the body of the nut 20 that extends from the large diameter 28 through the periphery of the body of the nut 20. The large diameter 28 and the slot 32 are cooperatively arranged to receive the helical spring 40.

The spring 40 in this embodiment is of a highly resilient spring like material that is helical wound into a spiral like formation. Tab ends, referred to as ends 44, 46 of the spring 40 extend radially outward. The spring 40 has the same angle of helix as the threads 25 of the nut 20 and thus the same angle of helix of the threads of the member which the nut 20 will threadably engage. The spring 40 has a vee form 42 (cross section) that matches the vee form of the threads 25 of the nut 20. The spring 40, however, in its relaxed state has a smaller diameter than that of the threads 25. The diameters of the thread 25 and the spring 40 referred to are those diameters as measured to a same reference point on the vee of the thread form that lies between the root and the crest of the thread form for both the threads 25 of the nut 20 and the vee form 42 of the spring 40. The diameter of the spring 40 thus must be enlarged to truly match the thread form 25 of the nut 20.

The spring 40 is installed in the large diameter 28 of the nut 20 with the ends 44, 46 of the spring 40 extending radially outward in the slot 32 of the nut 20. The axis of the spring 40 is aligned with the axis of the nut 20. The ends 44, 46 extending into the slot 32 are utilized to expand the spring 40 (increase its diameter) to facilitate threadably installing the locking device 10 on a member such as a shaft 50.

Referring now to FIGS. 2 and 5, the tool 60 for installing the thread locking device 10 has a projecting lug (finger) 62 that will spread the ends 44, 46 of the spring apart to thus expand the diameter of the spring 40 to at least match the thread form of the threads 25 of the nut 20. The large diameter 28 in the body of the nut 20 is sufficiently large to permit the expansion of the spring 40. The tool 60 has projecting lugs (fingers) 64 that will fit in the notches 22 of the nut 20 to facilitate rotating the nut by the tool 60. As the nut is rotated and threadably engaged with the shaft 50 as shown in FIG. 4, the spring 40 will be threadably engaged with the threads 52 of the shaft also. When the tool 60 is retracted, the ends 44, 46 will by the resilient force of the spring 40 move toward each other to collapse the diameter of the spring 40. As the diameter of the spring 40 collapses, the vee form 42 of the spring will be in forced frictional contact with the vee form of the threads 52 of the shaft 50 as illustrated in FIG. 3. The resilience of the spring 40 will urge the winding of the spring to close around the threads 52 of the shaft 50. A force applied to the nut 20 to urge rotation of the nut in the clockwise or counter clockwise direction will be resisted by the spring 40 in frictional engagement with the threads 52 of the shaft 50. The spring 40 in contact with the nut 20 will prevent rotation of the nut 20 while the spring 40 is in its collapsed condition and in frictional engagement with the threads 52. The locking device 10 is removed from the shaft 50 by once again expanding the spring 40 by spreading the ends 44, 46 apart as by the lug 62 of the tool 60 or other means to release the frictional gripping of the spring 40.

FIG. 3 illustrates the spring 40 in forced frictional contact with the threads 52 of the shaft 50. The spring 40 will not rotate in the threads due to this frictional contact and the spring in abutment contact with the nut, accordingly prevents rotation of the nut.

FIG. 4 illustrates the spring 40 in the expanded condition, i.e., the spring 42 is relieved from the pressure fit and interface 43, permitting the installation (or removal) of the nut 20 and the spring 40 on the shaft 50 by the common rotation of the nut 20 and the spring 40. The spring 40 is expanded by moving the ends 44, 46 apart such as by the tool 60 or other means. The spring 40 in the expanded condition will still become threadably engaged with the threads 52 of the shaft 50, but the spring 40 will not provide resistance to the rotation of the nut 20 while the spring 40 is in the expanded condition.

FIG. 6 illustrates an alternate embodiment of the spring 40. The spring 40' is helical wound in the same manner as spring 40 but rather that a vee section, the spring 40' has a round form (cross section) 42'. The spring 40' has ends 44', 46' that extend radially outward. The spring 40' is installed in the nut 20 in the same manner as spring 40 with the ends 44', 46' fitting in the slot 32. The spring 40' is expanded to facilitate threadably mounting the nut 20 and the spring 40' on a member, such as the shaft 50 in the same manner as spring 40. The round section 42' will forcibly frictionally engage the vee form of the threads 52 to fixedly maintain the nut 20 in position on the shaft 50 when the spring 40' is permitted to resiliently collapse (reduce in diameter). Whereas the round form does not provide the same surface-to-surface contact with the threads, it is believed to be somewhat less resistive to turning but is less expensive to produce. Thus, selection of one over the other will depend somewhat on the application.

Those skilled in the art will recognize that modifications and variations may be made without departing from the true spirit and scope of the invention. The invention is therefore not to be limited to the embodiments described and illustrated, but is to be determined from the appended claims.

I claim:

1. A device for securing a male threaded member to a female threaded member at a desired interengaged position comprising:
   one of said members provided with a spiral winding that is attached to and replaces a portion of the threads of said one of said members;
   said spiral winding permanently stressed for urging of the spiral winding into the thread grooves of the other of said members for interlocking the members, said spiral winding having opposed ends forming tab ends that are both free to move relative to said one of said members, and said tabs configured to be engaged by a tool for forcing relative movement of the tab ends to counter the urging of the spiral winding to permit relative turning of the members.

2. A device for securing a threaded nut threadably mated to a threaded shaft and to resist relative turning, comprising:
   a female threaded nut having a portion of the threads removed, a spiral wire residing in said nut and replacing the threads that have been removed, said spiral wire permanently stressed to urge winding of the spiral wire to close around the threads of the shaft for frictional gripping thereof, said spiral wire having end portions formed into tabs provided radially in a body portion of the nut, said body portion provided with a slot for receiving a tool finger, said tabs projected into said slot and being engaged by the tool finger projected into said slot whereby the tab ends are forcibly separated for opposing the winding force of the spiral wire and permitting turning of the nut onto the shaft until the tool finger is removed.

3. A device for securing a threaded nut threadably mated to a threaded shaft as defined in claim 2, wherein:
   said wire has a cross section suited for frictionally engaging the threads of the shaft.

4. A device for securing a threaded nut threadably mated to a threaded shaft as defined in claim 3, wherein:
   said wire has a cross section mating the cross section of the threads of said nut.

* * * * *

UNITED STATES PATENT AND TRADEMARK OFFICE
CERTIFICATE OF CORRECTION

PATENT NO. : 5,449,259
DATED : September 12, 1995
INVENTOR(S) : Kip E. Clohessy

It is certified that error appears in the above-indentified patent and that said Letters Patent is hereby corrected as shown below:

On the title page items [19] & [75],

The inventor's name was misspelled as "Kip E. Clohessey" on the printed patent and should be corrected to read as --Kip E. Clohessy".

Signed and Sealed this

Thirtieth Day of April, 1996

Attest:

BRUCE LEHMAN

*Attesting Officer*     *Commissioner of Patents and Trademarks*